Oct. 16, 1962     W. L. WANMAKER ET AL     3,059,133
ELECTRIC GAS DISCHARGE LAMP COMPRISING A LUMINESCENT LAYER
Filed Aug. 7, 1959
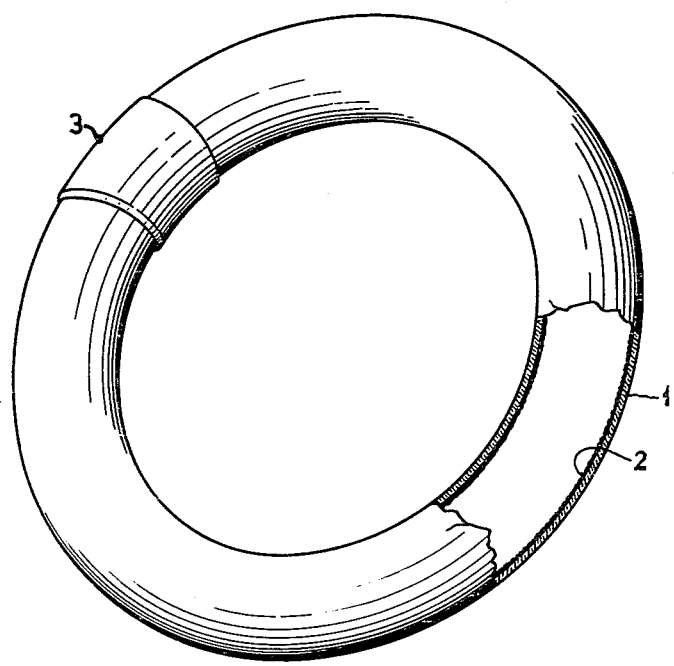
INVENTORS
WILLEM L. WANMAKER
CORNELIS BAKKER
JOHANNES W.M. ARENTS
BY
AGENT United States Patent Office 3,059,133
Patented Oct. 16, 1962

3,059,133
ELECTRIC GAS DISCHARGE LAMP COMPRISING A LUMINESCENT LAYER
Willem Lambertus Wanmaker, Cornelis Bakker, and Johannes Wilhelmus Maria Arents, all of Eindhoven, Netherlands, assignors to North American Philips Company, Inc., New York, N.Y., a corporation of Delaware
Filed Aug. 7, 1959, Ser. No. 832,325
Claims priority, application Netherlands Aug. 9, 1958
6 Claims. (Cl. 313—109)

Our invention relates to electric gas discharge lamps such as mercury vapour discharge lamps or lamps filled with a rare gas, having a glass envelope the inner side of which is coated with a layer of luminescent material. Our invention furthermore relates to a method of applying the luminescent layer to the glass envelope of these lamps.

In discharge lamps of the aforesaid kind the luminescent substance or the mixture of luminescent substances is usually applied to the side with the aid of an adhesive, for example, phosphoric acid or nitrocellulose.

The use of phosphoric acid involves various disadvantages, as it is very difficult to produce with it a luminescent layer that is completely without holes. In addition, phosphoric acid is hygroscopic and a luminescent layer produced with the aid of this substance exhibits, during the operation of the lamp, particularly if it contains mercury vapour, a comparatively strong blackening, which gradually decreases the luminous output.

Nitrocellulose does not exhibit these disagreeable properties, but it provides a less satisfactory adhesion of the luminescent substances, particularly of the very frequently employed, luminescent halophosphates particularly on strongly curved surfaces, for example, in narrow cylinders or toroidal lamp envelopes.

A principal object of our invention therefore is to provide an improved means for effecting the adhesion of luminescent material in discharge lamps of the aforesaid kind.

This and other objects of our invention will be apparent from the description that follows.

According to our invention we have found that barium tetraphosphate ($3BaO.2P_2O_5$) is an excellent adhesive for binding luminescent materials to the inner side of glass envelopes.

The adhesion obtained with the aid of barium tetraphosphate, even when luminescent halophosphates on strongly curved surfaces are used, is particularly satisfying. Moreover, at wavelengths over 250 m$\mu$ barium tetraphosphate has an ultraviolet absorption which is low with respect to the ultraviolet absorption of the conventional luminescent substances. Luminescent layers with barium tetraphosphate as an adhesive exhibit, moreover, only a slight reduction in the light output during the operation of the lamp.

In order to apply the luminescent layer use is, as a rule, made of a suspension of the luminescent substances in an organic liquid, for example, butyl acetate. In order to stabilize this suspension, use may be made of nitrocellulose. The barium tetraphosphate is suspended in this suspension to percentage by weight of between about 1 and 10%. It is an important advantage that the barium tetraphosphate does not produce flocculation of the suspension.

However, as an alternative, first a barium tetraphosphate layer may be applied in the lamp and subsequently the luminescent substances, for example, by spraying electro-static deposition or in the form of a suspension, such as a solution of nitrocellulose in butyl acetate.

As the frequently employed luminescent halophosphates adhere poorly to glass envelopes, it is particularly important that barium tetraphosphate be employed as an adhesive. This is the more necessary, since luminescent halophosphates must as a rule, be coarser in order to obtain a high light output, than other luminescent substances, for example, manganese-activated zinc beryllium silicates.

The barium tetraphosphate required for carrying out the invention may be produced by heating a mixture of $BaHPO_4$ or $BaCO_3$ with $(NH_4)_2HPO_4$ in the stoichiometric weight ratios between 800° C. and 900° C. for 2 to 4 hours. This heating may take place in any atmosphere. During the heating process the reaction product does not melt.

Our invention will now be explained in greater detail with reference to the following example and the drawing the sole FIGURE of which represents a lamp manufactured according to the invention.

*Example*

In 1 kg. of butylacetate there was dissolved 7.5 g. of nitrocellulose of a high viscosity. In this solution were suspended 1000 g. of a luminescent material, manganese- and antimony-activated calcium fluorochlorophosphate ($Ca_{10}P_6O_{24}F_{0.8}Cl_{0.2}$:Sb, Mn) and 50 g. of barium tetraphosphate. The mixture was then ground in a ball mill for 4 to 6 hours. Subsequently the resultant suspension was diluted with 600 mls. of butyl acetate containing 0.4% by weight of nitrocellulose. This suspension was then caused to rise and subsequently to flow out in a cylindrical, vertically arranged glass tube. On the inner wall of the tube a thin layer of the suspension adhered which was caused to drip for a few minutes and then dried by passing air through the tube. Then the tubular coated envelope was introduced into a furnace, and heated for 1 to 4 minutes while air was passed through at a temperature between 500° and 700° C. During this heating process the solvents were evaporated and the nitrocellulose burnt away. Thus the adhesion of the luminescent substance to the wall was then provided by the barium tetraphosphate.

A specific embodiment of the invention is shown in the accompanying drawing the sole figure of which shows an electric discharge lamp having a torus-shaped glass envelope 1, covered on the inside with a luminescent layer 2 containing as an adhesive barium tetraphosphate and a socket 3 containing contact pins on the side remote from the observer.

While we have described our invention in connection with specific embodiments and applications, other modifications thereof will be readily apparent to those skilled in this art without departing from the spirit and scope of the invention as defined in the appended claims.

What is claimed is:

1. An electric gas discharge lamp comprising a glass envelope coated on the inner side with a layer containing a luminescent material and barium tetraphosphate as an adhesive.

2. The electric gas discharge lamp of claim 1, wherein the glass envelope is shaped in the form of a torus.

3. The electric gas discharge lamp of claim 2, wherein the luminescent layer contains halophosphates as luminescent substances.

4. The electric gas discharge lamp of claim 3, wherein the lamp contains mercury vapour.

5. A method of applying the luminescent layer to the glass envelope of a gas discharge lamp as claimed in claim 1, comprising the steps of introducing a suspension of the luminescent material, barium tetraphosphate and nitrocellulose in an organic solvent into the glass envelope, removing the excess quantity of suspension, drying the envelope with the luminescent layer thereon and then heating the envelope at a temperature between 500° C. and 700° C. for a time which is sufficient for the nitrocellulose to be substantially completely removed.

6. The method of claim 5, wherein the suspension contains 1 to 10% by weight of barium tetraphosphate.

References Cited in the file of this patent

UNITED STATES PATENTS

| | | |
|---|---|---|
| 2,339,178 | Lemmers | Jan. 11, 1944 |
| 2,650,884 | Pakswer et al. | Sept. 1, 1953 |
| 2,662,830 | Darlaston | Dec. 15, 1953 |
| 2,684,306 | Brewer et al. | July 20, 1954 |
| 2,733,163 | Steadman | Jan. 31, 1956 |
| 2,843,504 | Bakel | July 15, 1958 |